United States Patent
Zhou

(10) Patent No.: US 10,338,674 B2
(45) Date of Patent: Jul. 2, 2019

(54) INFORMATION PROCESSING METHOD, INFORMATION PROCESSING APPARATUS, AND USER EQUIPMENT

(71) Applicant: Beijing Zhigu Rui Tuo Tech Co., Ltd., Beijing (CN)

(72) Inventor: Liang Zhou, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 0 days.

(21) Appl. No.: 15/284,652

(22) Filed: Oct. 4, 2016

(65) Prior Publication Data
US 2017/0154442 A1    Jun. 1, 2017

(30) Foreign Application Priority Data
Nov. 30, 2015    (CN) .......................... 2015 1 0856332

(51) Int. Cl.
*G06F 3/01*    (2006.01)
*A63F 13/00*    (2014.01)
(Continued)

(52) U.S. Cl.
CPC .............. *G06F 3/011* (2013.01); *A63F 13/00* (2013.01); *A63F 13/213* (2014.09);
(Continued)

(58) Field of Classification Search
None
See application file for complete search history.

(56) References Cited

U.S. PATENT DOCUMENTS

| 2009/0033737 A1* | 2/2009 | Goose ................... G06F 3/0481 348/14.07 |
| 2010/0050237 A1* | 2/2010 | Bokor ............... G06F 17/30041 726/4 |

(Continued)

FOREIGN PATENT DOCUMENTS

| CN | 103971401 A | 8/2014 |
| CN | 104035760 A | 9/2014 |

(Continued)

*Primary Examiner* — Michelle Chin
(74) *Attorney, Agent, or Firm* — Sheppard Mullin Richter & Hampton LLP

(57) ABSTRACT

Embodiments of the present application disclose an information processing method, an information processing apparatus, and a user equipment. The method comprises: obtaining object information of an external object in an environment in which a user is located, wherein the object information comprises function information and location information of the external object; determining at least one virtual object in virtual presented content at least according to the function information, wherein the at least one virtual object has a virtual attribute that matches at least one function corresponding to the function information; and determining a presentation attribute of the at least one virtual object at least according to the location information. According to the technical solution in the embodiments of the present application, sense experience brought by a virtual presentation device to the user can be consistent with other sense experience brought by the external object, and better immersive virtual reality experience is brought to the user.

12 Claims, 7 Drawing Sheets

(51) Int. Cl.
  *G06F 3/03*    (2006.01)
  *A63F 13/65*   (2014.01)
  *A63F 13/216*  (2014.01)
  *A63F 13/213*  (2014.01)
  *A63F 13/217*  (2014.01)

(52) U.S. Cl.
  CPC .......... *A63F 13/216* (2014.09); *A63F 13/217* (2014.09); *A63F 13/65* (2014.09); *G06F 3/0304* (2013.01); *G06F 2203/011* (2013.01)

(56) References Cited

U.S. PATENT DOCUMENTS

| | | |
|---|---|---|
| 2012/0176410 A1 | 7/2012 | Meier |
| 2012/0218299 A1* | 8/2012 | Hayakawa ............ A63F 13/06 345/633 |
| 2013/0033485 A1* | 2/2013 | Kollin .................. G06F 1/1637 345/419 |
| 2014/0292645 A1 | 10/2014 | Tsurumi |
| 2015/0356787 A1 | 12/2015 | Abe |
| 2015/0356788 A1 | 12/2015 | Abe |
| 2016/0171846 A1* | 6/2016 | Brav ...................... G08B 6/00 340/407.1 |

FOREIGN PATENT DOCUMENTS

| | | |
|---|---|---|
| CN | 104077023 A | 10/2014 |
| CN | 104603865 A | 5/2015 |
| CN | 104731337 A | 6/2015 |
| CN | 104937641 A | 9/2015 |
| WO | 2013171731 A1 | 11/2013 |

* cited by examiner

INFORMATION PROCESSING METHOD, INFORMATION PROCESSING APPARATUS, AND USER EQUIPMENT

TECHNICAL FIELD

The present application relates to the technical field of information processing, and in particular, to an information processing method, an information processing apparatus, and a user equipment.

BACKGROUND

A virtual reality technology is immersing, in a realistic presentation manner, a user in a virtual environment constructed by an electronic device, to cause the user to feel personally in the environment. Due to a small size, a head-mounted virtual reality device such as smart glasses or a smart helmet can enable the user to conveniently enjoy immersive virtual visual experience and auditory experience in many environments. In addition, with the rapid development of smart households and smart devices, interconnection between indoor smart devices becomes universal.

SUMMARY

A possible objective of embodiments of the present application is to provide a virtual reality based information processing solution.

According to a first aspect, a possible implementing solution of the present application provides an information processing method, comprising:

obtaining, by a user equipment, object information of an external object in an environment in which a user is located, wherein the object information comprises function information and location information of the external object;

determining at least one virtual object in virtual presented content at least according to the function information, wherein the at least one virtual object has a virtual attribute that matches at least one function corresponding to the function information; and determining a presentation attribute of the at least one virtual object at least according to the location information.

According to a second aspect, a possible implementing solution of the present application provides an information processing apparatus, comprising:

an object information obtaining module, configured to obtain object information of an external object in an environment in which a user is located, wherein the object information comprises function information and location information of the external object;

a virtual object determining module, configured to determine at least one virtual object in virtual presented content at least according to the function information, wherein the at least one virtual object has a virtual attribute that matches at least one function corresponding to the function information; and a presentation attribute determining module, configured to determine a presentation attribute of the at least one virtual object at least according to the location information.

According to a third aspect, a possible implementing solution of the present application provides a user equipment, comprising:

a memory, configured to store a program; and a processor, configured to execute the program stored in the memory, wherein the program causes the processor to execute the following operations:

obtaining object information of an external object in an environment in which a user is located, wherein the object information comprises function information and location information of the external object;

determining at least one virtual object in virtual presented content at least according to the function information, wherein the at least one virtual object has a virtual attribute that matches at least one function corresponding to the function information; and determining a presentation attribute of the at least one virtual object at least according to the location information.

According to at least one implementing solution in the embodiments of the present application, according to a function of an external object in a spatial environment in which a user is located, a matched virtual presented object in a virtual presentation device is found, and a presentation attribute of the virtual presentation device is determined at least according to a location of the external object. Therefore, sense experience brought by the virtual presentation device to the user can be consistent with other sense experience brought by the external object, and better immersive virtual reality experience is brought to the user.

DETAILED DESCRIPTION

Specific implementing manners of the present application are further described below in detail with reference to the accompanying drawings (same numerals in the accompanying drawings represent same elements) and embodiments. The following embodiments are intended to describe the present application, but not to limit the scope of the present application.

A person skilled in the art may understand that, terms such as "first" and "second" in the present application are intended only to distinguish different steps, devices, modules, or the like, which neither represent any particular technical meaning, nor indicate a necessary logical order between them.

The inventor of the present application finds that, due to development of a virtual reality technology, a user can conduct a virtual reality experience activity in an environment that is not specially intended for virtual reality experience, such as a home. Generally, there is another device in the environment, which may bring other sense experience to the user. For example, an air conditioner is mounted in a room for cooling or heating. In some possible scenarios, the other sense experience brought by the another device is inconsistent with sense experience of the user in a virtual reality scenario, and influences immersion of the user in the virtual reality scenario. For example, the user feels the air conditioner blowing on the left side of the user, but in the virtual reality scenario, the user sees a fan on the right side of the scene rotating and blowing.

Figure 1:
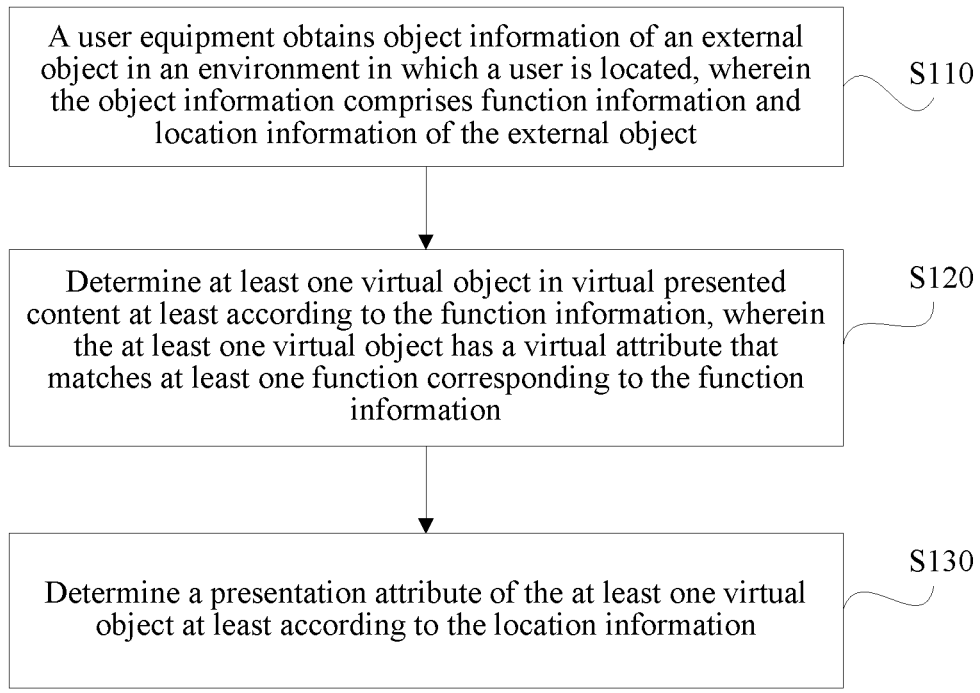
FIG. 1 is a flowchart of an information processing method according to an embodiment of the present application.

Therefore, as shown in FIG. 1, an embodiment of the present application provides an information processing method, comprising:

S110: A user equipment obtains object information of an external object in an environment in which a user is located, wherein the object information comprises function information and location information of the external object.

S120: Determine at least one virtual object in virtual presented content at least according to the function information, wherein the at least one virtual object has a virtual attribute that matches at least one function corresponding to the function information.

S130: Determine a presentation attribute of the at least one virtual object at least according to the location information.

According to an implementing solution in this embodiment of the present application, according to a function of an external object in a spatial environment in which a user is located, a matched virtual presented object in virtual presented content of a virtual presentation device is found, and a presentation attribute of the virtual presentation device is determined at least according to a location of the external object. Therefore, sense experience brought by the virtual presentation device to the user can be consistent with other sense experience brought by the external object, and better immersive virtual reality experience is brought to the user.

For example, an information processing apparatus provided in the present application executes this embodiment, and performs S110 to S130. Specifically, the information processing apparatus may be disposed in a user equipment in a manner of software, hardware, or software and hardware, or the information processing apparatus is the user equipment. The user equipment comprises but not limited to: a smartphone, smart glasses, a smart helmet, and the like, wherein the smart glasses comprise smart frame classes and smart contact lenses.

The steps in this embodiment of the present application are further described by using the following implementing manner.

S110: A user equipment obtains object information of an external object in an environment in which a user is located, wherein the object information comprises function information and location information of the external object.

In a possible implementing manner, the external object may be an external device.

In a possible implementing manner, optionally, the user equipment may obtain the object information through device interaction (for example, communication) with the external device.

In another possible implementing manner, the user equipment may obtain the object information in another possible manner. For example, the object information is obtained from another external device; or the object information is obtained only on the user equipment side. For example, the object information is obtained by obtaining an image of the external object and performing image recognition; or the object information is obtained according to a manual input by the user.

In this embodiment of the present application, the function information of the external object is information corresponding to a function of the external object. The function information may comprise, for example, function type information. In some possible implementing manners, the function information may further comprise function parameter information. For example, a function type of a fan is blowing, and function parameter information may comprise, for example, information about a capacity of discharged air and an air discharging direction and range; and a function of a wooden table comprises: holding another object (the another object may comprise, for example, a body part of the user, such as a hand of the user), and function parameter information may comprise, for example, the height of the table and the size of a surface of the table (when the held object comprises the hand of the user, the function parameter information may further comprise a material and a texture of the table surface).

In a possible implementing manner, the location information may be information about an absolute location of the external object in the environment. Alternatively, in a possible implementing manner, the location information may be information about a relative location of the external object relative to the user equipment or the user.

In a possible implementing manner, regardless of what the function of the external object is, S120 is performed after the object information is obtained.

In another possible implementing manner, optionally, between S110 and S120, the method further comprises the following operation:

determining whether the function corresponding to the function information is a sense related function that influences at least one specified sense of the user, wherein S120 is performed as a response only when the function is the sense related function.

In a possible implementing manner, the at least one specified sense is another sense different from a sense corresponding to a virtual presentation, and may be preset. For example, when the virtual presentation is an audiovisual presentation corresponding to a visual sense and an auditory sense, the at least one specified sense may comprise a touch sense and/or a smell sense; when the virtual presentation is a visual presentation corresponding only to the visual sense, the at least one specified sense may further comprise the auditory sense.

In this implementing manner, the external object may be an external object that influences the at least one specified sense of the user, may be, for example, an object that influences the touch sense of the user, such as an air conditioner, a fan, a humidifier, a refrigerator, or a mug with hot water; an object that influences the smell sense of the user, such as an oven or a cake; and an object that emits sound and influences the auditory sense of the user when the virtual presentation for the user does not comprise an auditory presentation, such as a television or a sound box.

Certainly, this embodiment of the present application is mainly described by using an example in which the virtual presentation is a visual presentation. In another possible scenario, the virtual presentation may be another presentation manner, and in this case, the at least one specified sense may comprise the visual sense.

In this implementing manner, when the function is not the sense related function, subsequent operations may be not performed, to save a device resource.

S120: Determine at least one virtual object in virtual presented content at least according to the function information, wherein the at least one virtual object has a virtual attribute that matches at least one function corresponding to the function information.

In this embodiment of the present application, a background of the virtual presented content may also be considered as a virtual object.

In this implementing manner, that a virtual object has a virtual attribute that matches a function mainly comprises two cases:

In one case, a virtual function of the virtual object is the same as the function. For example, a function of a first external object is heating, the virtual object is a fire, and according to a setting, the fire may correspond to multiple virtual functions, which comprise, for example, heating and illumination. In this case, because a virtual function of the fire is the same as the function of the external object, it may be considered that the virtual object, that is, the fire, has a virtual attribute that matches the function of heating.

In the other case, a presentation status influencing factor of the virtual object is the function. For example, a function of a second external object is blowing, and the virtual object is still a fire. According to a setting, a presentation status of the fire is influenced by multiple influencing factors, which comprise, for example, blowing and precipitation. In this case, because the influencing factors comprise the blowing, it may be considered that the virtual object, that is, the fire, has a virtual attribute that matches the function of blowing.

Therefore, according to the foregoing description, in a possible implementing manner, optionally, the virtual attribute may comprise at least one virtual function.

In this implementing manner, that the at least one virtual object has the virtual attribute that matches the at least one function comprises:

at least one virtual function in the at least one virtual function is the same as the at least one function.

In some possible scenarios, the at least one function may be different from the at least one virtual function in text description, but senses and feelings of the user on the two are consistent; therefore, it is also considered that the at least one function is the same as the at least one virtual function. In some possible implementing manners, for example, a table of correspondence between a function and a virtual function may be preset, to determine all virtual functions that are the same as a particular function, and/or determine all functions that are the same as a particular virtual function, to determine the at least one virtual object.

In another possible implementing manner, optionally, the virtual attribute may comprise at least one presentation status influencing factor; and that the at least one virtual object has the virtual attribute that matches the at least one function comprises:

the at least one presentation status influencing factor comprises the at least one function.

A person skilled in the art may know that, in some possible scenarios, a virtual attribute of a virtual object may simultaneously match multiple functions of multiple external objects. For example, in the implementing manner described above, the virtual attribute of the fire simultaneously matches the function of the first external object and the function of the second external object. Therefore, in S120, the fire may be determined according to the function of the first external object, or the fire may be determined according to the function of the second external object.

In S120, at least one virtual object whose virtual attribute matches the at least one function may be further determined in all virtual objects in the virtual presented content according to the function information of the external object.

S130: Determine a presentation attribute of the at least one virtual object at least according to the location information.

In a possible implementing manner, optionally, the presentation attribute may comprise a presentation location.

In this implementing manner, S130 may be, for example, determining the presentation location of the at least one virtual object at least according to the location information.

In a scenario in which a virtual function of a virtual object is the same as a function of the external object, in a possible implementing manner, optionally, according to S130, a presentation location of the virtual object may be determined to be consistent with a location of the external object relative to the user, to cause that a virtual location of the virtual object sensed by the user is the same as or similar to the location of the external object relative to the user; or at least, a virtual direction of the virtual object sensed by the user is the same as or similar to an actual sensed direction brought by the function of the external object to the user.

Figure 2A:
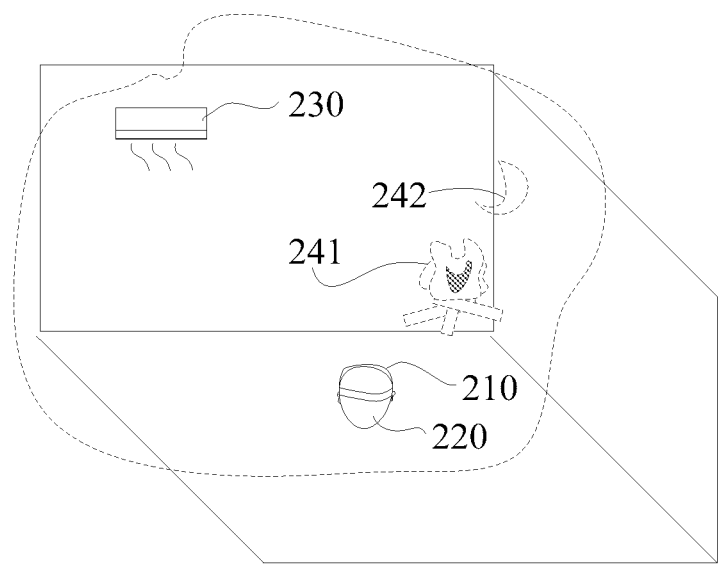
FIG. 2a and FIG. 2b are respectively schematic diagrams of virtual scenarios presented when a method according to an embodiment of the present application is not used and when a method according to an embodiment of the present application is used in an application scenario.
Figure 2B:
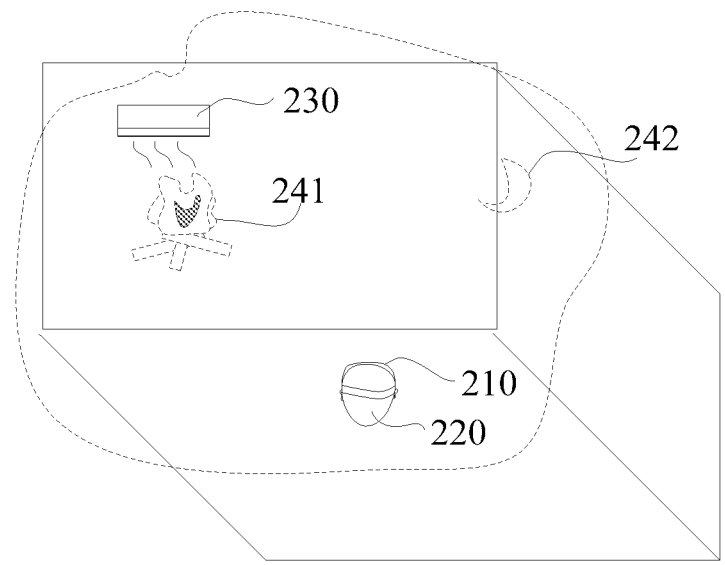

For example, as shown in FIG. 2a and FIG. 2b, the solid line part represents a real object, and the dashed line part is a virtual scenario that is presented to a user 220 by a user equipment—virtual reality glasses 210.

As shown in FIG. 2a and FIG. 2b, in this implementing manner, an environment in which the user 220 is located is a room, the room comprises an external device—air conditioner 230, and a current function of the air conditioner 230 is heating.

When the method in this implementing manner is not used, for example, the user may see a virtual scenario shown in FIG. 2a. Virtual presented content corresponding to the virtual scenario comprises two virtual objects: a fire 241 and a moon 242, and the fire 241 is located in the right front of the user 220. Certainly, in another possible implementing manner, a background of the virtual scenario (for example, a background of a night in the open) may also be a virtual object.

It can be known from the environment in which the user is actually located, the air conditioner 230 is located in the left front of the user. In this case, the user may feel heat coming from the left front through the touch sense of the body. However, eyes of the user see that, in the virtual scenario, there is not any object that can produce heat in the left front, but there is a fire 241 in the right front. Therefore, touch experience obtained by using the touch sense of the user is inconsistent with visual experience obtained by using the visual sense of the user, ruining immersion of the user in the virtual scenario.

Therefore, according to the method in this embodiment of the present application, the virtual reality glasses 210 may obtain, from the air conditioner 230 through device interaction, object information of the air conditioner 230, that is, information about the function of heating and information about a relative location of the air conditioner 230 relative to the user (for example, the air conditioner 230 may have a location sensor, which can obtain the information about the relative location).

According to S120, it is determined that a virtual object in the two virtual objects comprised in the virtual presented content—the fire 241 has a virtual attribute that matches the function of heating: heating.

Finally, a presentation location of the fire 241 is determined according to the information about the relative location of the air conditioner 230 relative to the user 220, to cause that the presentation location of the fire 241 is consistent with the location of the air conditioner 230.

According to the method in this embodiment of the present application, the virtual scenario shown in FIG. 2b can be obtained. The location of the fire 241 seen by the user 220 is consistent with the location that the user feels the air conditioner 230 emitting heat at. Immersion of the user in the virtual scenario can be enhanced, and user experience can be improved.

A possible application scenario in this embodiment of the present application is:

When a user plays a virtual reality based virtual game, a location of a virtual object in a scene of the virtual game is configured according to object information, obtained by a game device, of an external object in a game environment. In addition, further, if virtual objects in virtual presented content of the virtual game may be selectively presented, an appropriate virtual object may be selected according to the object information for presentation.

In a possible implementing manner, optionally, the function corresponding to the function information has a directional characteristic, and the object information further comprises direction information corresponding to the directional characteristic.

In this implementing manner, optionally, the presentation attribute further comprises a presentation orientation.

In this implementing manner, S130 further comprises: determining the presentation attribute of the at least one virtual object at least according to the location information and the direction information, for example, determining a presentation location and a presentation orientation of the at least one virtual object according to the location information and the direction information.

For example, in a possible implementing manner, the external object is an air conditioner, and a function of the air conditioner comprises blowing. Virtual presented content comprises a fan, and a virtual function of the fan also comprises blowing. Therefore, according to the method in this embodiment of the present application, a location of the fan may be determined according to a location of the air conditioner. Further, the function of blowing has a directional characteristic. Therefore, in this implementing manner, the function information further comprises a direction of the blowing, and the presentation attribute further comprises a presentation orientation of the fan, to cause that an orientation of the fan seen by the user is consistent with the direction of the blowing.

In a possible implementing manner, a presentation status of the at least one virtual object is variable, and is influenced by the function of the external object. For example, a presentation status influencing factor of the at least one virtual object comprises the function. In this implementing manner, optionally, the presentation attribute comprises a presentation status.

For example, in the implementing manner shown in FIG. 2b, in a possible scenario, besides heating, the air conditioner 230 further comprises a function of blowing. A presentation status of the fire 241 is set to being influenced by blowing. For example, the shape of a flame changes with the strength and direction of the blowing. Therefore, according to the location information of the air conditioner 230, besides the presentation location of the fire 241, a presentation status of the fire 241 may be further determined.

In a possible implementing manner, the user equipment is a device that virtually presents the at least one virtual object. Therefore, the method further comprises:

presenting the at least one virtual object according to the presentation attribute.

A person skilled in the art may understand that, in the method of the specific implementing manner of the present application, the sequence numbers of the steps do not mean an execution order, the execution order of the steps should be determined according to their functions and internal logic, and shall not be construed as a limitation to the implementation process of the specific implementing manner of the present application.

Figure 3:
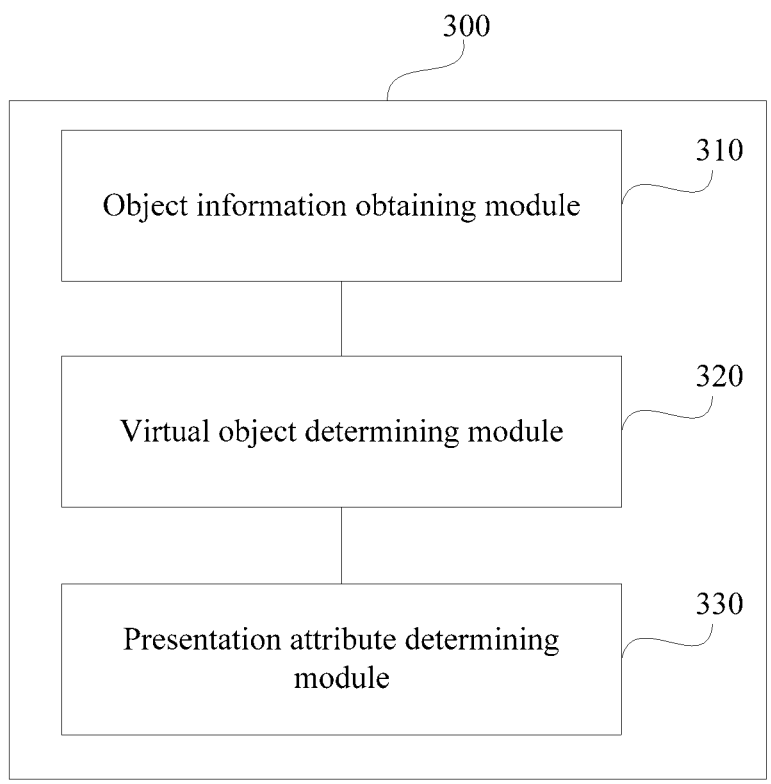
FIG. 3 is a schematic block diagram of a structure of an information transmission processing according to an embodiment of the present application.

As shown in FIG. 3, an embodiment of the present application provides an information processing apparatus 300, comprising:

an object information obtaining module 310, configured to obtain object information of an external object in an environment in which a user is located, wherein the object information comprises function information and location information of the external object;

a virtual object determining module 320, configured to determine at least one virtual object in virtual presented content at least according to the function information, wherein the at least one virtual object has a virtual attribute that matches at least one function corresponding to the function information; and a presentation attribute determining module 330, configured to determine a presentation attribute of the at least one virtual object at least according to the location information.

According to an implementing solution in this embodiment of the present application, according to a function of an external object in a spatial environment in which a user is located, a matched virtual presented object in virtual presented content of a virtual presentation device is found, and a presentation attribute of the virtual presentation device is determined at least according to a location of the external object. Therefore, sense experience brought by the virtual presentation device to the user can be consistent with other sense experience brought by the external object, and better immersive virtual reality experience is brought to the user.

The apparatus in this embodiment of the present application is further described by using the following implementing manner.

In a possible implementing manner, the external object may be an external device.

In a possible implementing manner, optionally, the object information obtaining module 310 may be a communications module, configured to obtain the object information through device interaction with the external device or another external device.

In another possible implementing manner, optionally, the object information obtaining module 310 may have another possible structure. For example, in a possible implementing manner, the object information obtaining module 310 may comprise a camera, configured to obtain an image of the external object, and then obtain the object information through image recognition.

In this embodiment of the present application, the function information of the external object is information corresponding to a function of the external object. The function information may comprise, for example, function type information. In some possible implementing manners, the function information may further comprise function parameter information. For example, a function type of a fan is blowing, function parameter information may comprise, for example, information about a capacity of discharged air.

In a possible implementing manner, the location information may be information about an absolute location of the external object in the environment. Alternatively, in a possible implementing manner, the location information may be information about a relative location of the external object relative to the user equipment or the user.

In this embodiment of the present application, a background of the virtual presented content may also be considered as a virtual object.

In this implementing manner, that a virtual object has a virtual attribute that matches a function mainly comprises two cases:

In one case, a virtual function of the virtual object is the same as the function.

In the other case, a presentation status influencing factor of the virtual object is the function.

Therefore, in a possible implementing manner, optionally, the virtual attribute may comprise at least one virtual function.

In this implementing manner, that the at least one virtual object has the virtual attribute that matches the at least one function comprises:

at least one virtual function in the at least one virtual function is the same as the at least one function.

In some possible scenarios, the at least one function may be different from the at least one virtual function in text description, but senses and feelings of the user on the two are consistent; therefore, in this implementing manner, it is also considered that the at least one function is the same as the at least one virtual function. In some possible implementing manners, for example, a table of correspondence between a function and a virtual function may be preset, to determine all virtual functions that are the same as a particular function, and/or determine all functions that are the same as a particular virtual function, to determine the at least one virtual object.

In another possible implementing manner, optionally, the virtual attribute may comprise at least one presentation status influencing factor; and that the at least one virtual object has the virtual attribute that matches the at least one function comprises:

the at least one presentation status influencing factor comprises the at least one function.

A person skilled in the art may know that, in some possible scenarios, a virtual attribute of a virtual object may simultaneously match multiple functions of multiple external objects.

In a possible implementing manner, optionally, the presentation attribute may comprise a presentation location.

Figure 4A:
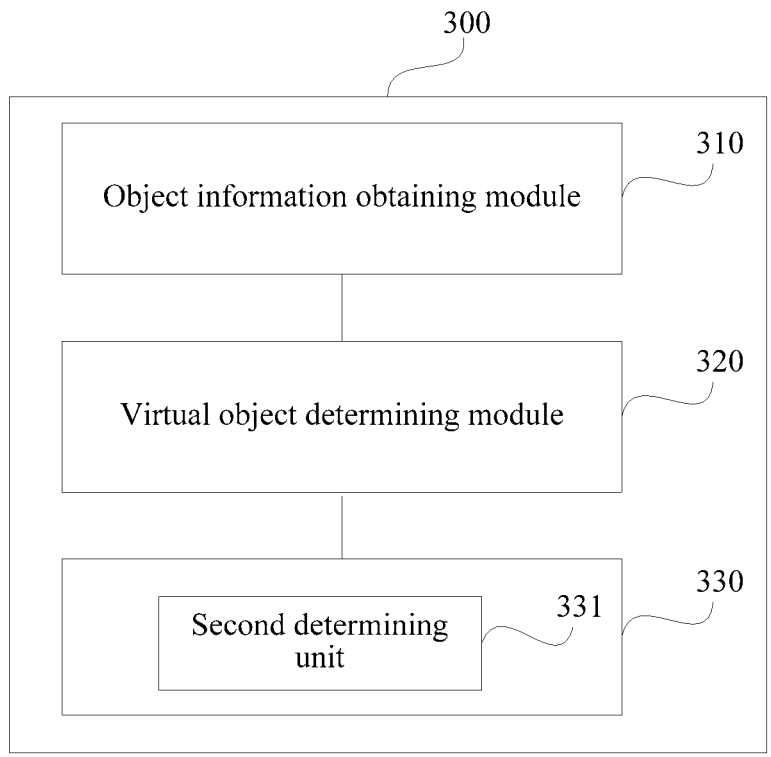
FIG. 4a to FIG. 4e are schematic block diagrams of structures of five information processing apparatuses according to an embodiment of the present application.

Therefore, in a possible implementing manner, as shown in FIG. 4a, the presentation attribute determining module 330 comprises:

a second determining unit 331, configured to determine the presentation location of the at least one virtual object according to the location information.

For example, in a possible implementing manner, in a scenario in which a virtual function of a virtual object is the same as a function of the external object, the second determining unit 331 may determine a presentation location of the virtual object to be consistent with a location of the external object relative to the user, to cause that a virtual location of the virtual object sensed by the user is the same as or similar to the location of the external object relative to the user; or at least, a virtual direction of the virtual object sensed by the user is the same as or similar to an actual sensed direction brought by the function of the external object to the user.

In a possible implementing manner, optionally, the function corresponding to the function information has a directional characteristic, and the object information further comprises direction information corresponding to the directional characteristic.

In this implementing manner, optionally, the presentation attribute further comprises a presentation orientation.

Figure 4B:
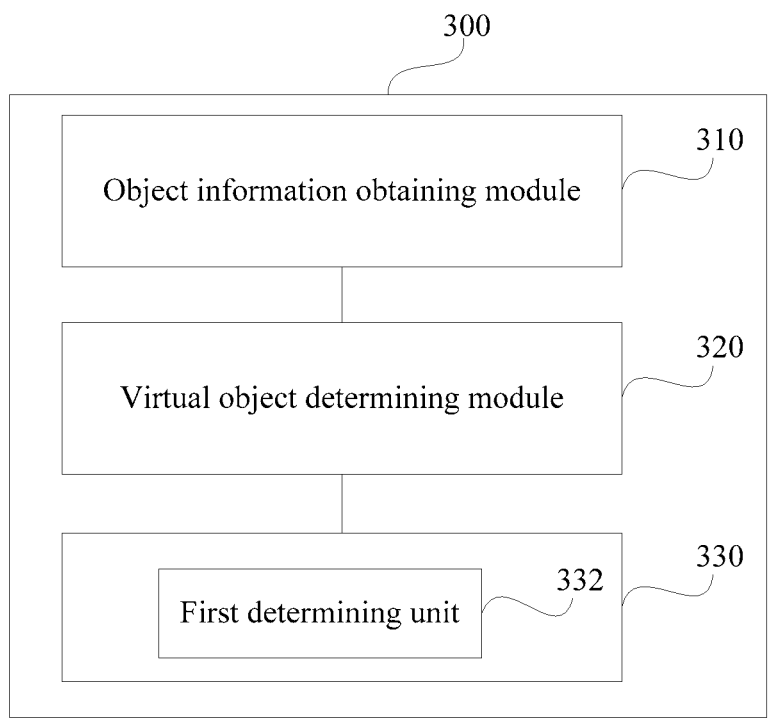

In this implementing manner, as shown in FIG. 4b, the presentation attribute determining module 330 may comprise:

a first determining unit 332, configured to determine the presentation attribute of the at least one virtual object at least according to the location information and the direction information, for example, determine a presentation location and a presentation orientation of the at least one virtual object according to the location information and the direction information.

Figure 4C:
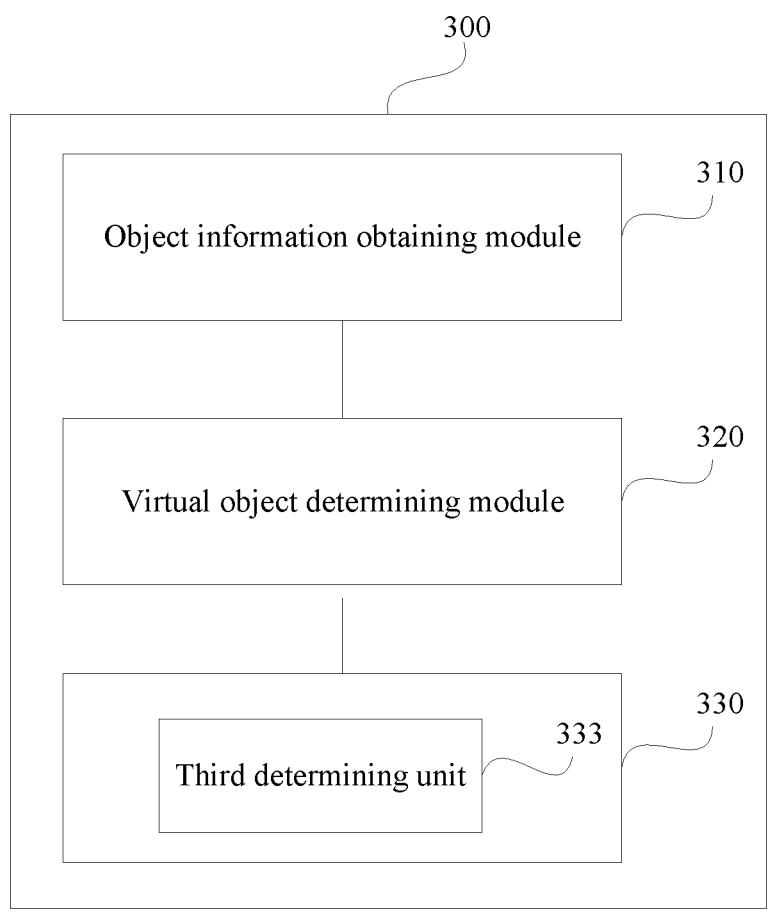

In a possible implementing manner, a presentation status of the at least one virtual object is variable, and is influenced by the function of the external object. For example, a presentation status influencing factor of the at least one virtual object comprises the function. In this implementing manner, optionally, the presentation attribute comprises a presentation status. That is, as shown in FIG. 4c, the presentation attribute determining module 330 may comprise:

a third determining unit 333, configured to determine the present status of the at least one virtual object according to the location information.

A person skilled in the art may know that, in another possible implementing manner, the presentation attribute determining module 330 may comprise both the second determining unit 331 and the third determining unit 333; or comprise both the first determining unit 332 and the third determining unit 333.

Figure 4D:
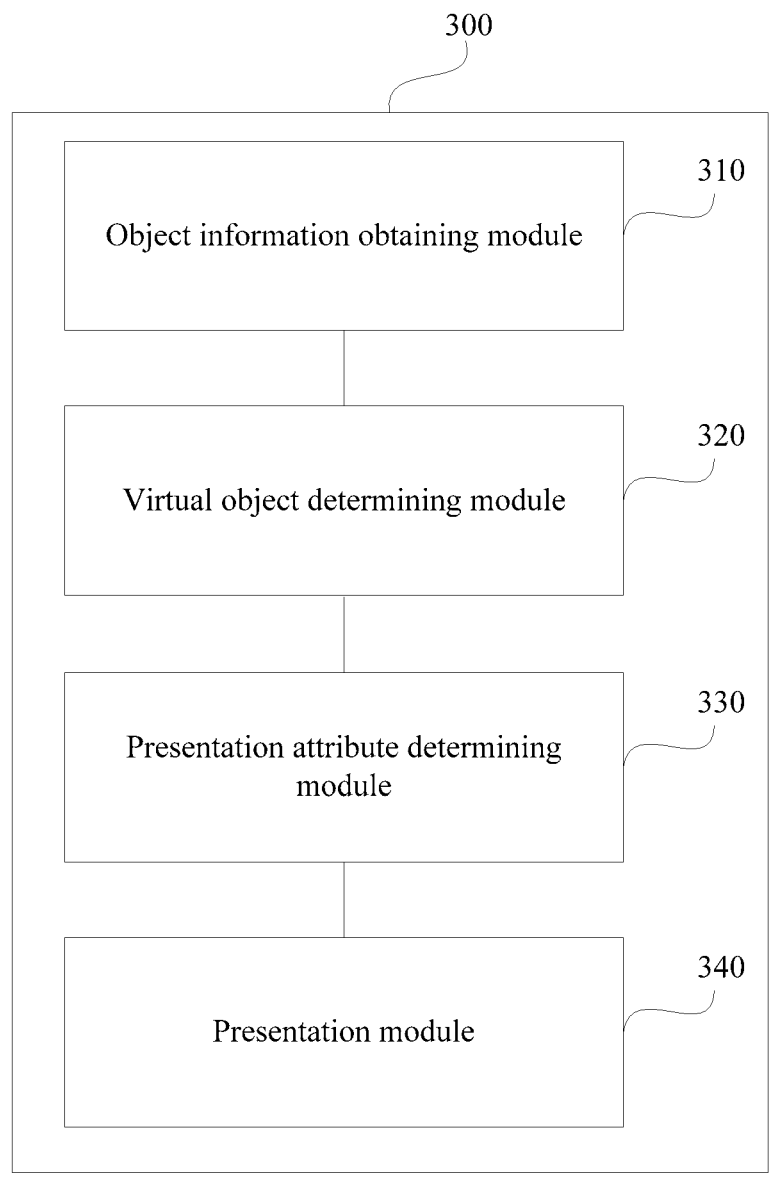

In a possible implementing manner, the apparatus 300 may be a device that virtually presents the at least one virtual object. Therefore, as shown in FIG. 4d, the apparatus 300 further comprises:

a presentation module 340, configured to present the at least one virtual object according to the presentation attribute.

Figure 4E:
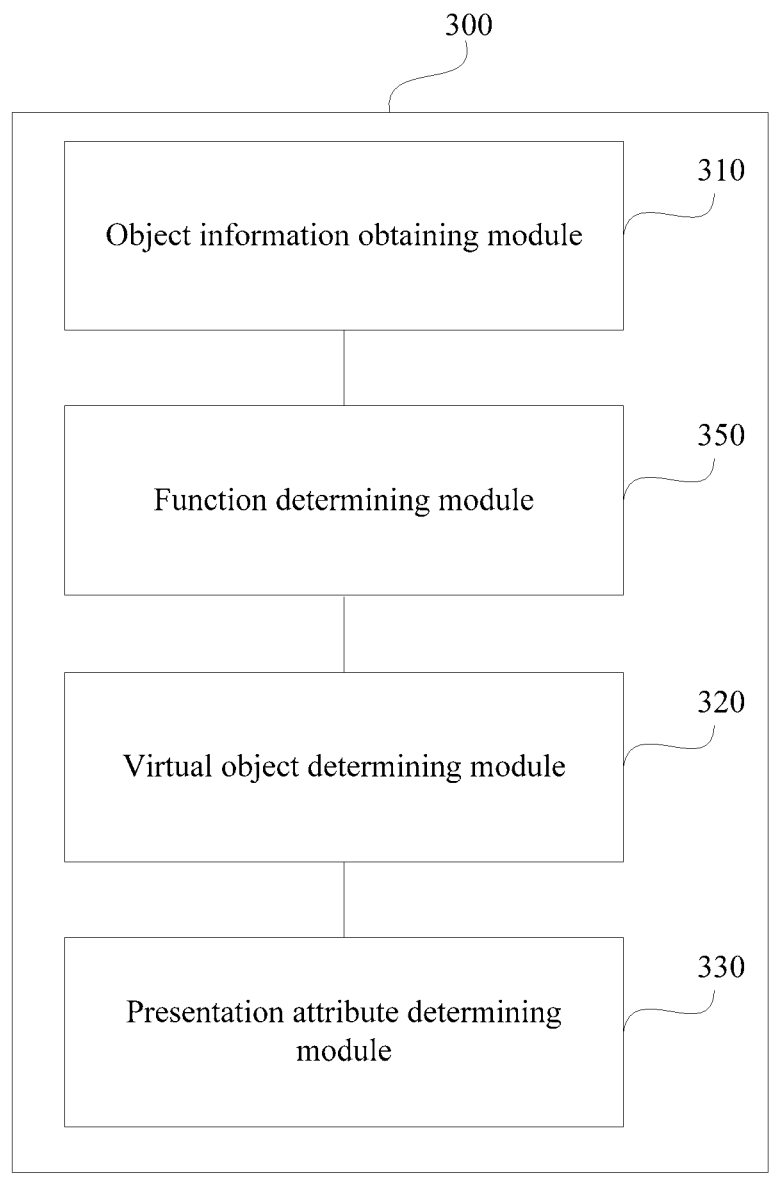

As shown in FIG. 4e, in a possible implementing manner, optionally, the apparatus 300 may further comprise:

a function determining module 350, configured to determine whether the function is a sense related function that influences at least one specified sense of the user.

In this implementing manner, the virtual object determining module 320 is further configured to determine the at least one virtual object at least according to the function information as a response only when the function is the sense related function.

In a possible implementing manner, the at least one specified sense is another sense different from a sense corresponding to a virtual presentation, and may be preset. For example, when the virtual presentation is an audiovisual presentation corresponding to a visual sense and an auditory sense, the at least one specified sense may comprise a touch sense and/or a smell sense; when the virtual presentation is a visual presentation corresponding only to the visual sense, the at least one specified sense may further comprise the auditory sense.

In this implementing manner, the external object may be an external object that influences the at least one specified sense of the user.

Certainly, this embodiment of the present application is mainly described by using an example in which the virtual presentation is a visual presentation. In another possible scenario, the virtual presentation may be another presentation manner, and in this case, the at least one specified sense may comprise the visual sense.

In this implementing manner, when the function is not the sense related function, subsequent operations may be not performed, to save a device resource.

For further descriptions of the modules and units in this embodiment of the present application, refer to corresponding descriptions in the foregoing method embodiment.

Figure 5:
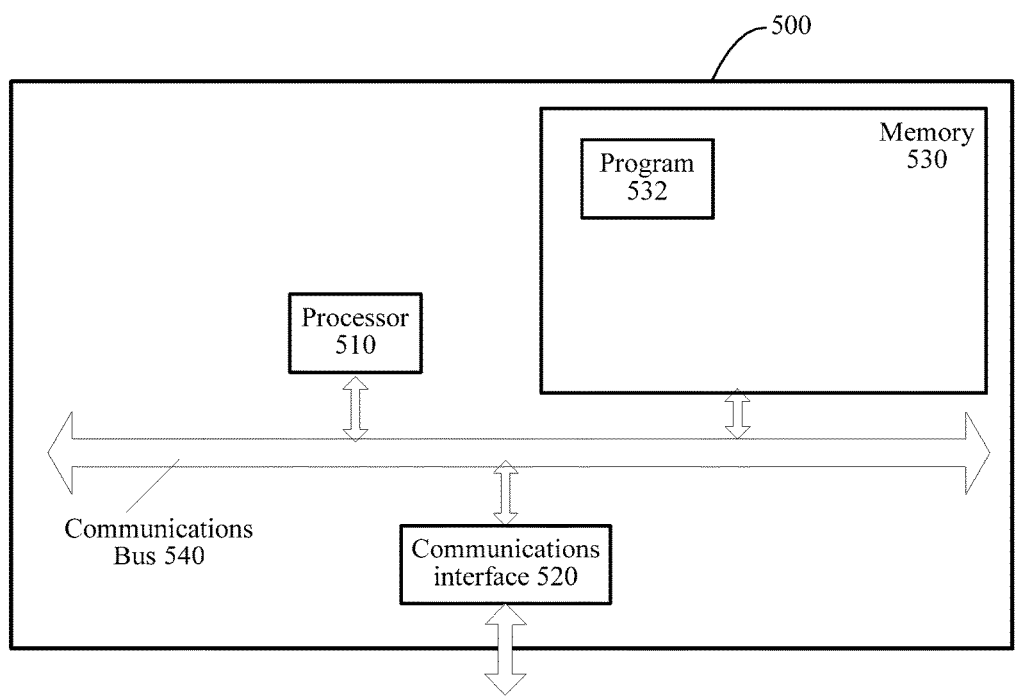
FIG. 5 is a schematic structural diagram of a structure of a user equipment according to an embodiment of the present application.

FIG. 5 is a schematic structural diagram of a user equipment 500 according to an embodiment of the present application. Specific implementation of the user equipment 500 is not limited in a specific embodiment of the present application. As shown in FIG. 5, the user equipment 500 may comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532, and may specifically execute related steps in the foregoing method embodiment.

Specifically, the program 532 may comprise program code, wherein the program code comprises a computer operation instruction.

The processor 510 may be a central processing unit (CPU), or an application specific integrated circuit (ASIC), or be configured into one or more integrated circuits for implementing the embodiments of the present application.

The memory 530 is configured to store the program 532. The memory 530 may comprise a high-speed random access memory (RAM), and may further comprise a non-volatile memory, for example, at least one magnetic disk storage. The program 532 may be specifically configured to cause the user equipment 500 to execute the following operations:

obtaining object information of an external object in an environment in which a user is located, wherein the object information comprises function information and location information of the external object;

determining at least one virtual object in virtual presented content at least according to the function information, wherein the at least one virtual object has a virtual attribute that matches at least one function corresponding to the function information; and determining a presentation attribute of the at least one virtual object at least according to the location information.

For specific implementation of the steps in the program 532, reference may be made to corresponding descriptions of corresponding steps and units in the foregoing embodiments, and details are not described herein again. It may be clearly understood by a person skilled in the art that, for the purpose of convenient and brief description, for the specific working process of the foregoing device and module, reference may be made to the corresponding process in the foregoing method embodiment, and the details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to perform all or a part of the steps of the methods described in the embodiments of the present application. The storage medium comprises any medium that can store program code, such as a USB flash drive, a removable hard disk, a read-only memory (ROM), a RAM, a magnetic disk, or an optical disc.

The foregoing implementing manners are merely intended to describe the present application rather than limit the present application. A person of ordinary skill in the art may make modifications and variations without departing from the spirit and scope of the present application. Therefore, all equivalent technical solutions shall also fall within the scope of the present application, and the patent protection scope of the present application shall be subject to the claims.

What is claimed is:

1. An information processing method, comprising:
    obtaining, by a user equipment, object information of an external object in an environment in which a user is located, wherein the object information comprises function information and location information of the external object, and the function information of the external object includes information corresponding to a function of the external object;
    determining at least one virtual object in virtual presented content at least according to the function information, wherein the at least one virtual object has a virtual attribute that matches at least one function corresponding to the function information;
    determining a presentation attribute of the at least one virtual object at least according to the location information, wherein the at least one function is at least one sense related function that influences at least one specified sense of the user different from a sense corresponding to the virtual presented content, wherein at least one virtual function of the virtual attribute is the same as the at least one function; or at least one presentation status influencing factor of the virtual attribute comprises the at least one function.

2. The method of claim 1, wherein
    the presentation attribute comprises a presentation location.

3. The method of claim 2, wherein
    the at least one function corresponding to the function information has a directional characteristic, and the object information further comprises direction information corresponding to the directional characteristic;
    the presentation attribute further comprises a presentation orientation; and
    the determining a presentation attribute of the at least one virtual object at least according to the location information further comprises:
    determining the presentation attribute of the at least one virtual object at least according to the location information and the direction information.

4. The method of claim 1, wherein
    the presentation attribute comprises a present status.

5. The method of claim 1, wherein before the operation of determining at least one virtual object in virtual presented content at least according to the function information, the method further comprises:
 determining whether the at least one function is at least one sense related function that influences at least one specified sense of the user, wherein
 the operation of determining at least one virtual object at least according to the function information is executed as a response only when the at least one function is the at least one sense related function.

6. The method of claim 1, wherein the method further comprises:
 presenting the at least one virtual object according to the presentation attribute.

7. A user equipment, wherein the user equipment comprises:
 a memory, configured to store a program; and
 a processor, configured to execute the program stored in the memory, wherein the program causes the processor to execute the following operations:
 obtaining object information of an external object in an environment in which a user is located, wherein the object information comprises function information and location information of the external object, and the function information of the external object includes information corresponding to a function of the external object;
 determining at least one virtual object in virtual presented content at least according to the function information, wherein the at least one virtual object has a virtual attribute that matches at least one function corresponding to the function information;
 determining a presentation attribute of the at least one virtual object at least according to the location information, wherein the at least one function is at least one sense related function that influences at least one specified sense of the user different from a sense corresponding to the virtual presented content, wherein at least one virtual function of the virtual attribute is the same as the at least one function; or at least one presentation status influencing factor of the virtual attribute comprises the at least one function.

8. The user equipment of claim 7, wherein
 the presentation attribute comprises a presentation location.

9. The user equipment of claim 8, wherein
 the at least one function corresponding to the function information has a directional characteristic, and the object information further comprises direction information corresponding to the directional characteristic;
 the presentation attribute further comprises a presentation orientation; and
 the operations further comprise determining the presentation attribute of the at least one virtual object at least according to the location information and the direction information.

10. The user equipment of claim 7, wherein
 the presentation attribute comprises a present status.

11. The user equipment of claim 7, wherein the operations further comprise:
 determine determining whether the at least one function is at least one sense related function that influences at least one specified sense of the user; and
 determining the at least one virtual object at least according to the function information as a response only when the at least one function is the at least one sense related function.

12. The user equipment apparatus of claim 7, wherein the operations further comprise:
 presenting the at least one virtual object according to the presentation attribute.

\* \* \* \* \*